(12) United States Patent
Sandberg

(10) Patent No.: US 9,910,866 B2
(45) Date of Patent: Mar. 6, 2018

(54) METHODS, APPARATUSES AND COMPUTER PROGRAM PRODUCTS FOR AUTOMATICALLY GENERATING SUGGESTED INFORMATION LAYERS IN AUGMENTED REALITY

(75) Inventor: Jesper Sandberg, Valby (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 59 days.

(21) Appl. No.: 12/827,417

(22) Filed: Jun. 30, 2010

(65) Prior Publication Data

US 2012/0001939 A1 Jan. 5, 2012

(51) Int. Cl.
*G09G 5/00* (2006.01)
*G06F 17/30* (2006.01)
(Continued)

(52) U.S. Cl.
CPC ... *G06F 17/30268* (2013.01); *G01C 21/3682* (2013.01); *G06T 11/00* (2013.01);
(Continued)

(58) Field of Classification Search
CPC ......... G09G 5/14; G06T 19/00; G06T 19/006; G06T 11/60
(Continued)

(56) References Cited

U.S. PATENT DOCUMENTS 6,219,045 B1    4/2001   Leahy et al.
6,243,094 B1 *   6/2001   Sklar ............................ 715/853
(Continued)

FOREIGN PATENT DOCUMENTS

CN    101470008 A    7/2009
CN    101482864 A    7/2009
(Continued)

OTHER PUBLICATIONS

International Search Report and Written Opinion mailed Jun. 29, 2011 in corresponding international application No. PCT/FI2011/050120.
(Continued)

*Primary Examiner* — Jin-Cheng Wang
(74) *Attorney, Agent, or Firm* — Alston & Bird LLP

(57) ABSTRACT

An apparatus for automatically suggesting information layers in augmented reality may include a processor and memory storing executable computer program code that cause the apparatus to at least perform operations including providing layers of information relating to virtual information corresponding to information indicating a current location of the apparatus. The computer program code may further cause the apparatus to determine that a layer(s) of information is enabled to provide virtual information for display. The virtual information corresponds to locations of real world objects in or proximate to the current location. The computer program code may further cause the apparatus to determine other information layers associates with content for the current location based on the number of items virtual information for the enabled layer being below a threshold and automatically suggest one or more other layers of information for selection. Corresponding methods and computer program products are also provided.

20 Claims, 9 Drawing Sheets

(51) Int. Cl.
  *G06T 19/00* (2011.01)
  *G01C 21/36* (2006.01)
  *H04L 29/06* (2006.01)
  *H04L 29/08* (2006.01)
  *G06T 11/00* (2006.01)
  *H04N 21/258* (2011.01)
  *G06K 9/00* (2006.01)

(52) U.S. Cl.
  CPC ............ *G06T 19/006* (2013.01); *H04L 67/18* (2013.01); *H04L 67/38* (2013.01); *G06K 9/00671* (2013.01); *H04N 21/25841* (2013.01)

(58) Field of Classification Search
  USPC ...... 345/629; 701/200, 201, 213; 348/14.02, 348/116, 333.02
  See application file for complete search history.

(56) References Cited

U.S. PATENT DOCUMENTS

| | | | |
|---|---|---|---|
| 2001/0015733 | A1* | 8/2001 | Sklar .......................... 345/853 |
| 2002/0049775 | A1 | 4/2002 | Friedrich et al. |
| 2002/0065605 | A1 | 5/2002 | Yokota |
| 2003/0074253 | A1 | 4/2003 | Scheuring et al. |
| 2004/0243307 | A1* | 12/2004 | Geelen .......................... 701/213 |
| 2007/0242131 | A1* | 10/2007 | Sanz-Pastor et al. ..... 348/14.02 |
| 2008/0091689 | A1 | 4/2008 | Mansikkaniemi |
| 2008/0268876 | A1 | 10/2008 | Gelfand et al. |
| 2009/0013052 | A1 | 1/2009 | Robarts et al. |
| 2009/0150064 | A1* | 6/2009 | Geelen .......................... 701/201 |
| 2009/0171561 | A1* | 7/2009 | Geelen .......................... 701/201 |
| 2009/0171576 | A1 | 7/2009 | Kim et al. |
| 2009/0187447 | A1 | 7/2009 | Cheng et al. |
| 2010/0145948 | A1 | 6/2010 | Yang et al. |
| 2010/0149399 | A1* | 6/2010 | Mukai et al. ............ 348/333.02 |
| 2010/0262362 | A1 | 10/2010 | Naito et al. |
| 2010/0280747 | A1* | 11/2010 | Achthoven .................... 701/200 |
| 2011/0188760 | A1* | 8/2011 | Wright et al. ................ 382/203 |
| 2011/0199479 | A1* | 8/2011 | Waldman ...................... 348/116 |

FOREIGN PATENT DOCUMENTS

| | | |
|---|---|---|
| CN | 101578497 A | 11/2009 |
| CN | 101751468 A | 6/2010 |
| EP | 1 547 389 A2 | 4/2004 |
| EP | 2104074 A1 | 9/2009 |
| EP | 2154481 A1 | 2/2010 |
| JP | 2007-011161 A | 1/2007 |
| WO | WO 09/015012 A1 | 1/2009 |
| WO | WO 2009/132677 A1 | 11/2009 |

OTHER PUBLICATIONS

European Patent Office, Extended European Search Report for Application No. 11800230.2, dated May 6, 2014, 8 pages, Germany.
Lee, Ryong, et al, "Layer-Based Media Integration for Mobile Mixed-Reality Applications", Proceedings of the Third International Conference On Next Generation Mobile Applications, Services, and Technologies, Sep. 15, 2009, pp. 58-63, IEEE, USA.
Canadian Intellectual Property Office, Examiner Requisition for Application No. 2,804,096, dated Apr. 9, 2014, 2 pages, Canada.
Japan Patent Office, Office Action for Application No. 2013-517419, dated Feb. 21, 2014, 4 pages, Japan.
State Intellectual Property Office of The P.R.C., Office Action for Application No. 201180041542.8, dated Mar. 9, 2016, 4 pages, China.
State Intellectual Property Office of The P.R.C., First Office Action for Application No. 201180041542.8, dated Jan. 16, 2015, 9 pages, China.
State Intellectual Property Office of The P.R.C., Second Office Action for Application No. 201180041542.8, dated Sep. 14, 2015, 7 pages, China.

* cited by examiner

METHODS, APPARATUSES AND COMPUTER PROGRAM PRODUCTS FOR AUTOMATICALLY GENERATING SUGGESTED INFORMATION LAYERS IN AUGMENTED REALITY

TECHNOLOGICAL FIELD

An embodiment of the invention relates generally to user interface technology and, more particularly, relate to a method, apparatus, and computer program product for automatically generating one or more suggested information layers in an augmented reality environment.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. Due to the now ubiquitous nature of electronic communication devices, people of all ages and education levels are utilizing electronic devices to communicate with other individuals or contacts, receive services and/or share information, media and other content. One area in which there is a demand to increase ease of information transfer relates to the delivery of services to a user of a mobile terminal. The services may be in the form of a particular media or communication application desired by the user, such as a music player, a game player, an electronic book, short messages, email, content sharing, etc. The services may also be in the form of interactive applications in which the user may respond to a network device in order to perform a task or achieve a goal. The services may be provided from a network server or other network device, or even from the mobile terminal such as, for example, a mobile telephone, a mobile television, a mobile gaming system, etc.

In some situations, mobile terminals may enhance the interaction that users have with their environment. Numerous use cases have developed around the concept of utilizing mobile terminals to enhance user interaction with their local area such as, for example, virtual tour guides and other mixed reality applications. Mixed reality involves the merging of real and virtual worlds. In some cases, mixed reality involves mixing real world image data with virtual objects in order to produce environments and visualizations in which physical and digital objects co-exist and potentially also interact in real time. Mixed reality includes augmented reality, which uses digital imagery to augment or add to real world imagery, and virtual reality, which simulates real world environments using computer simulation.

Augmented reality is a fast growing area, which is currently available on many mobile platforms (e.g., Symbian™, Android™, iPhone™, Windows Mobile™). The concept of augmented reality is to overlay graphics or information on a live video stream or a still image from a camera in a communication device. The graphics/information may be of any kind. In augmented reality graphics/information about the environment and objects in it can be stored and retrieved as an information layer on top of a view of the real world.

A common use of augmented reality is to overlay points of interests (POI) on a video stream or still image. These POIs may be static information, like landmarks, for example or any information that may be geo-coded (e.g., contains a coordinate). An example of the use of augmented reality can be seen in FIG. 1, where information provided by Wikipedia™ and tweets provided by Twitter™ are overlaid on a camera view of a communication device.

When a consumer presses one of the Wikipedia™ icons for example, the user may be presented with more information about an article associated with the selected icon. As an example, augmented reality may be used by consumers when they are in new places, and want to obtain information about things they see. By standing in front of a tourist attraction and pointing a camera at the attraction, the consumer can get information about the attraction.

From consumer studies related to augmented reality, it has become clear, that one of the most important features for the consumers using an augmented reality browser is that consumers want to be able to select the content that should be shown on the camera view of a device.

One problem with allowing consumers to be able to select the content that should be shown on the camera view is that the consumer might enable an information layer, which does not have any information available for the consumer's current location. It might be that the information layer enabled by the consumer has appropriate information for the consumer's normal surrounding and when the consumer travels to another location, for example during a holiday or for work, the enabled information layer may not be suitable. For instance, the information layer may not have any or very little information available for the consumer to see.

Such a scenario may put the consumer in a situation where the augmented reality browser does not provide any value to the consumer, since the browser would simply be a camera view. An example of this scenario is shown in FIG. 2. In the example of FIG. 2, the consumer may be interested in pictures. As such, a consumer may enable an information layer on a communication device which provides pictures to an augmented reality application that may be shown in the camera view of the communication device. In the example of FIG. 2, the consumer has enabled the flickr.com information layer via the communication device. Unfortunately, there are very little pictures/information provided from flickr.com in the current location of the consumer. As shown in FIG. 2, the consumer can only see one icon 3 associated with information (e.g., pictures) provided from flickr.com in the camera view.

Currently, the problem described above associated with the consumer enabling an information layer which does not have any information available for the consumer's current location has typically been solved, by allowing the consumer to utilize the communication device to manually choose between known information layers provided by an augmented reality application. In this regard, the consumer typically has to go through a trial-and-error phase by enabling an information layer, then checking to determine if the information layer has any information for the consumer's current location. If the information layer does not have any information for the consumer's current location, the consumer typically has to try another information layer, so on and so forth, until the augmented reality browser is able to provide the level of information that the consumer wants.

This process may be tedious to the consumer and may be time consuming if there are many information layers available for the consumer's location. In situations in which the problem of the lack of information provided by an enabled information layer may arise, it may be most important for the consumer to get relevant information as quick as possible, not spending 10 or 30 minutes trying to find useful information. As such, the trial and error approach may be burdensome to consumers and may result in consumer dissatisfaction.

In view of the foregoing drawbacks, it may be desirable to provide an alternative mechanism by which to provide information layers to users of communication devices.

BRIEF SUMMARY

A method, apparatus and computer program product are therefore provided for automatically generating one or more suggested information layers in augmented reality. The information layers may be items of information provided by a content or service provider that include geo-location data as well as other data. The geo-location data may be utilized for the provision of corresponding items of information (e.g., virtual information) on a display. In this regard, the items of information may be overlaid on real world objects currently being displayed.

An example embodiment may determine whether an information layer(s) enabled by a user, for example, provides information for the current location of a communication device or the location of the real world objects currently being displayed by the communication device. If the information for the enabled information layer is below a predetermined threshold, an example embodiment may automatically suggest one or more information layers that have information for the location which may be selected by the user. In this regard, an example embodiment may present the user with a list of suggested or optional layers which have or are associated with information in the current location. The information for the location may be items of virtual information (e.g., virtual objects such as graphical elements) that may be overlaid on corresponding real world objects currently being displayed. Upon selecting any of the suggested information layers, information corresponding to the selected information layer(s) may be provided to and shown on a display. In this manner, an exemplary embodiment may provide an efficient mechanism for providing augmented reality or virtual information to a device for selection by a user so that the user does not have to utilize a trial-and-error process to identify relevant information for a current location.

The suggested information layers presented to a device for selection by the user may relate to information in the same category as information of an enabled information layer. In this regard, the an example embodiment may automatically suggest information layers for selection that provide the same kind of information (e.g., images, video data) as the information of an enabled information layer. By utilizing an example embodiment of the invention, the problem of users not having any or very little information available for a current location may be alleviated. Since the user may select one or more of the suggested information layers in order to view corresponding information, an example embodiment allow the user to control which information should be presented for display.

In one exemplary embodiment, a method for automatically suggesting information layers in augmented reality is provided. The method may include facilitating provision of a plurality of layers of information. The layers of information may relate in part to one or more items of virtual information corresponding to information indicative of a current location of an apparatus. The method may further include determining that at least one of the layers of information is enabled to provide one or more items of virtual information for display. The items of virtual information may correspond to locations of real world objects in or proximate to the current location. The method may further include determining whether one or more other information layers are associated with content for the current location based on a determination that the number of items of virtual information for the enabled layer of information is below a predetermined threshold. The method may further include automatically suggest one or more of the other layers of information for selection.

In another exemplary embodiment, an apparatus for automatically suggesting information layers in augmented reality is provided. The apparatus may include a processor and memory including computer program code. The memory and the computer program code are configured to, with the processor, cause the apparatus to at least perform operations including facilitating provision of a plurality of layers of information. The layers of information may relate in part to one or more items of virtual information corresponding to information indicative of a current location of the apparatus. The computer program code may further cause the apparatus to determine that at least one of the layers of information is enabled to provide one or more items of virtual information for display. The items of virtual information may correspond to locations of real world objects in or proximate to the current location. The computer program code may further cause the apparatus to determine whether one or more other information layers are associated with content for the current location based on a determination that the number of items of virtual information for the enabled layer of information is below a predetermined threshold. The computer program code may further cause the apparatus to automatically suggest one or more of the other layers of information for selection.

In another exemplary embodiment, a computer program product for automatically suggesting information layers in augmented reality is provided. The computer program product includes at least one computer-readable storage medium having computer-executable program code portions stored therein. The computer-executable program code instructions may include program code instructions for facilitating provision of a plurality of layers of information. The layers of information may relate in part to one or more items of virtual information corresponding to information indicative of a current location of an apparatus. The program code instructions may also determine that at least one of the layers of information is enabled to provide one or more items of virtual information for display. The items of virtual information correspond to locations of real world objects in or proximate to the current location. The program code instructions may also determine whether one or more other information layers are associated with content for the current location based on a determination that the number of items of virtual information for the enabled layer of information is below a predetermined threshold. The program code instructions may also automatically suggest one or more of the other layers of information for selection.

An embodiment of the invention may provide a better user experience since the user may be able to focus on the virtual information that may be overlaid on real world objects, instead of spending time guessing which layer may have some virtual information in the current location of a device. As a result, device users may enjoy improved capabilities with respect to applications and services accessible via the device.

BRIEF DESCRIPTION OF THE SEVERAL VIEWS OF THE DRAWINGS

Figure 1:
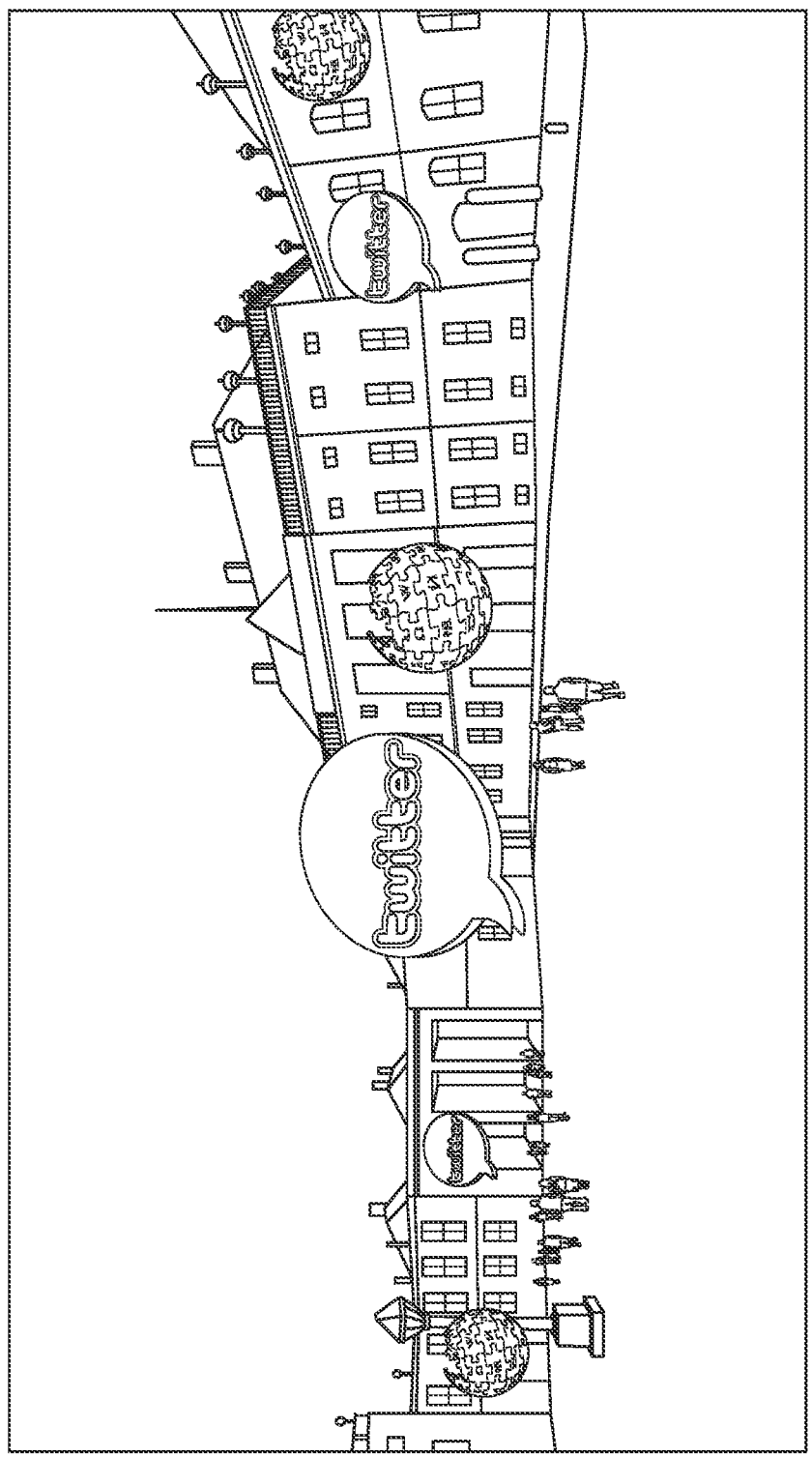
Figure 2:
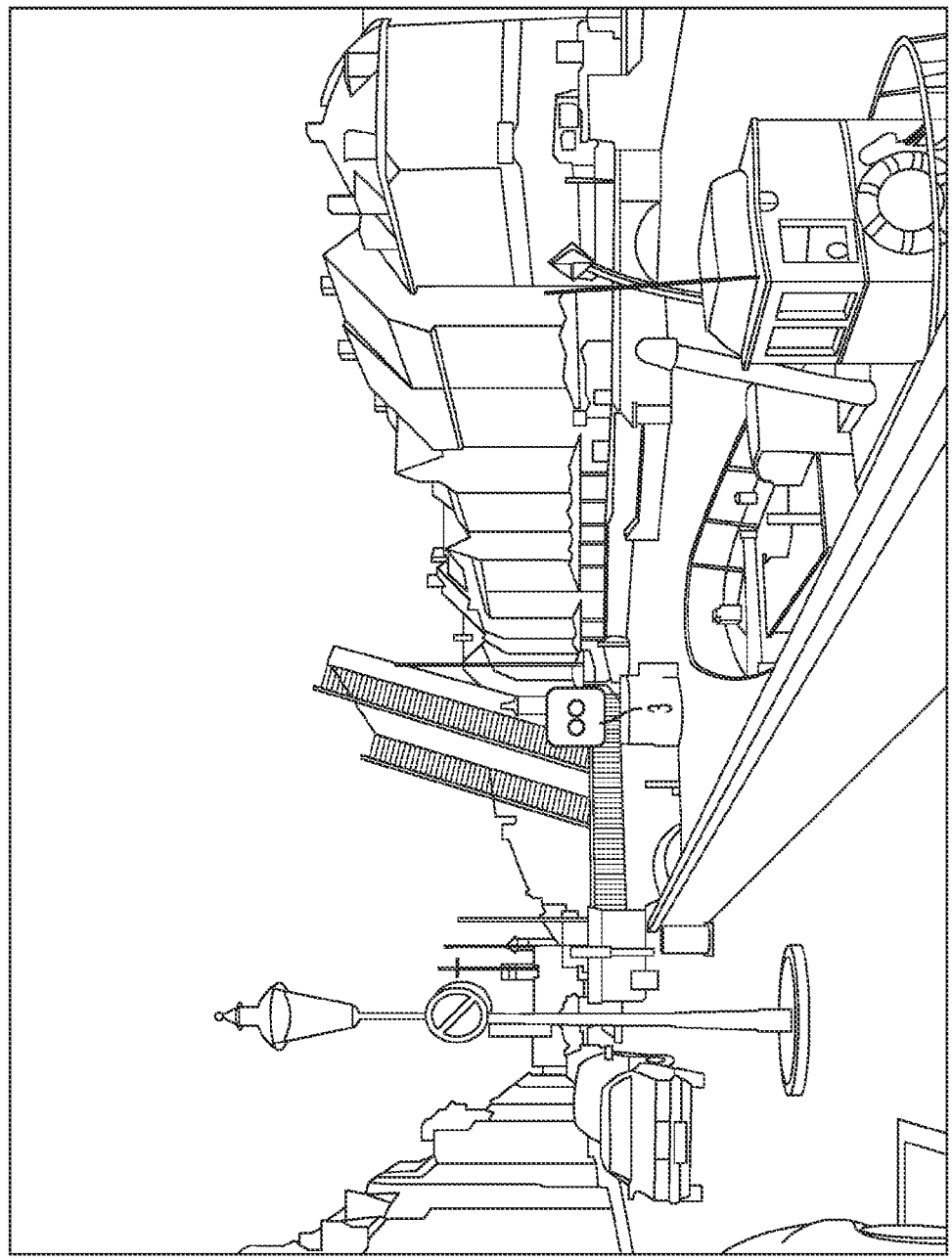
Figure 3:
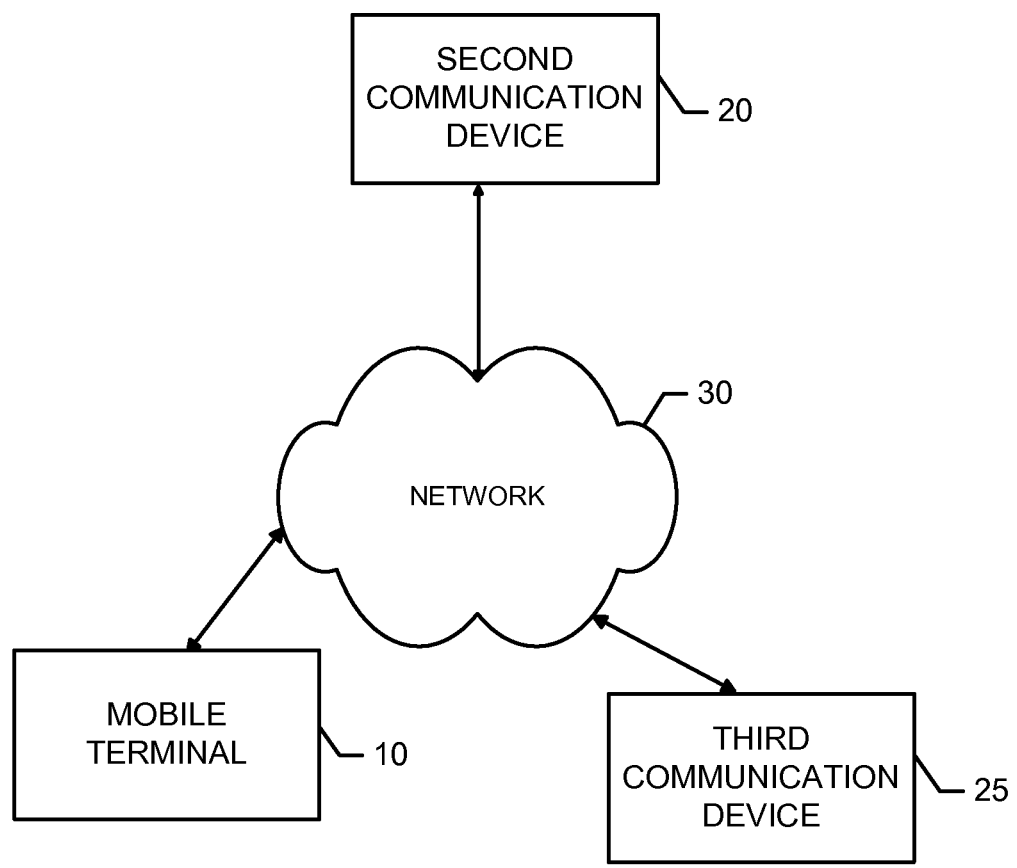
Figure 4:
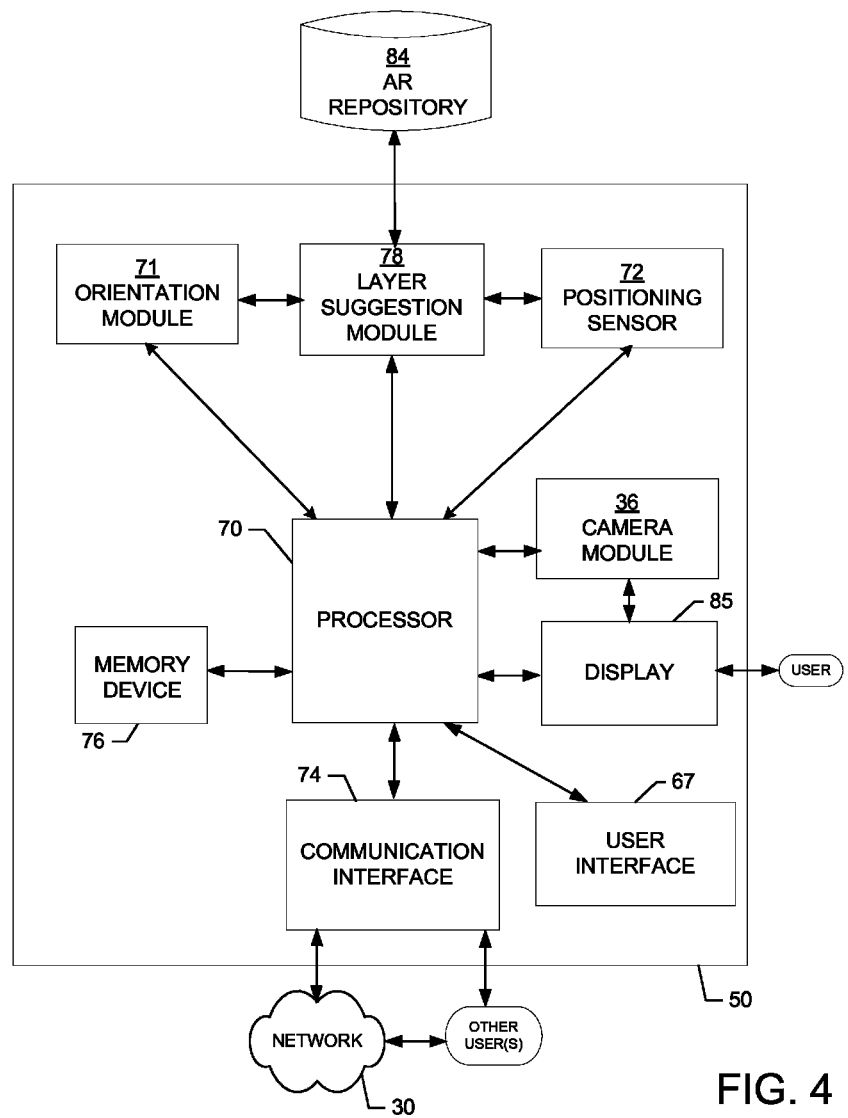
Figure 5:
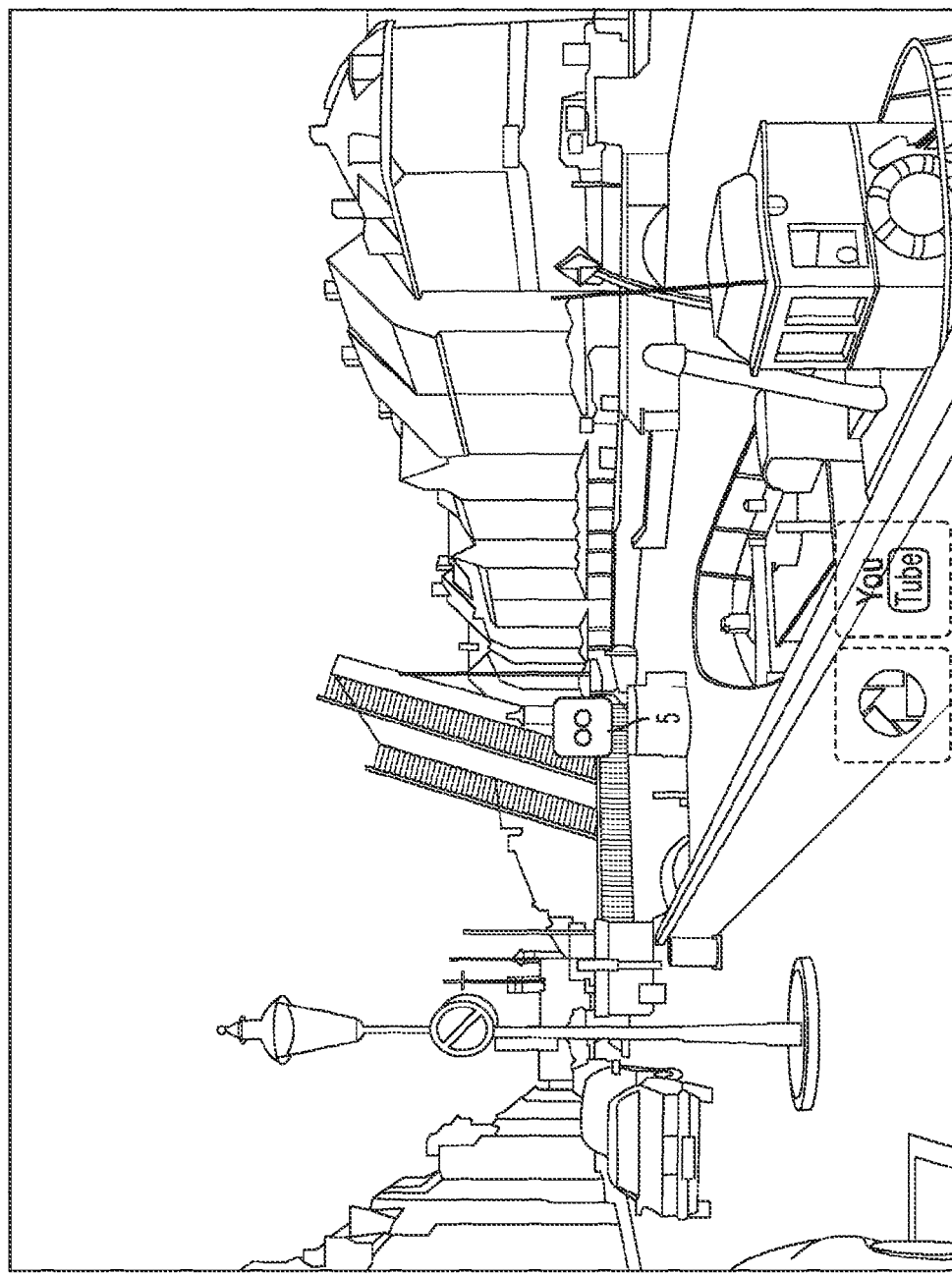
Figure 6:
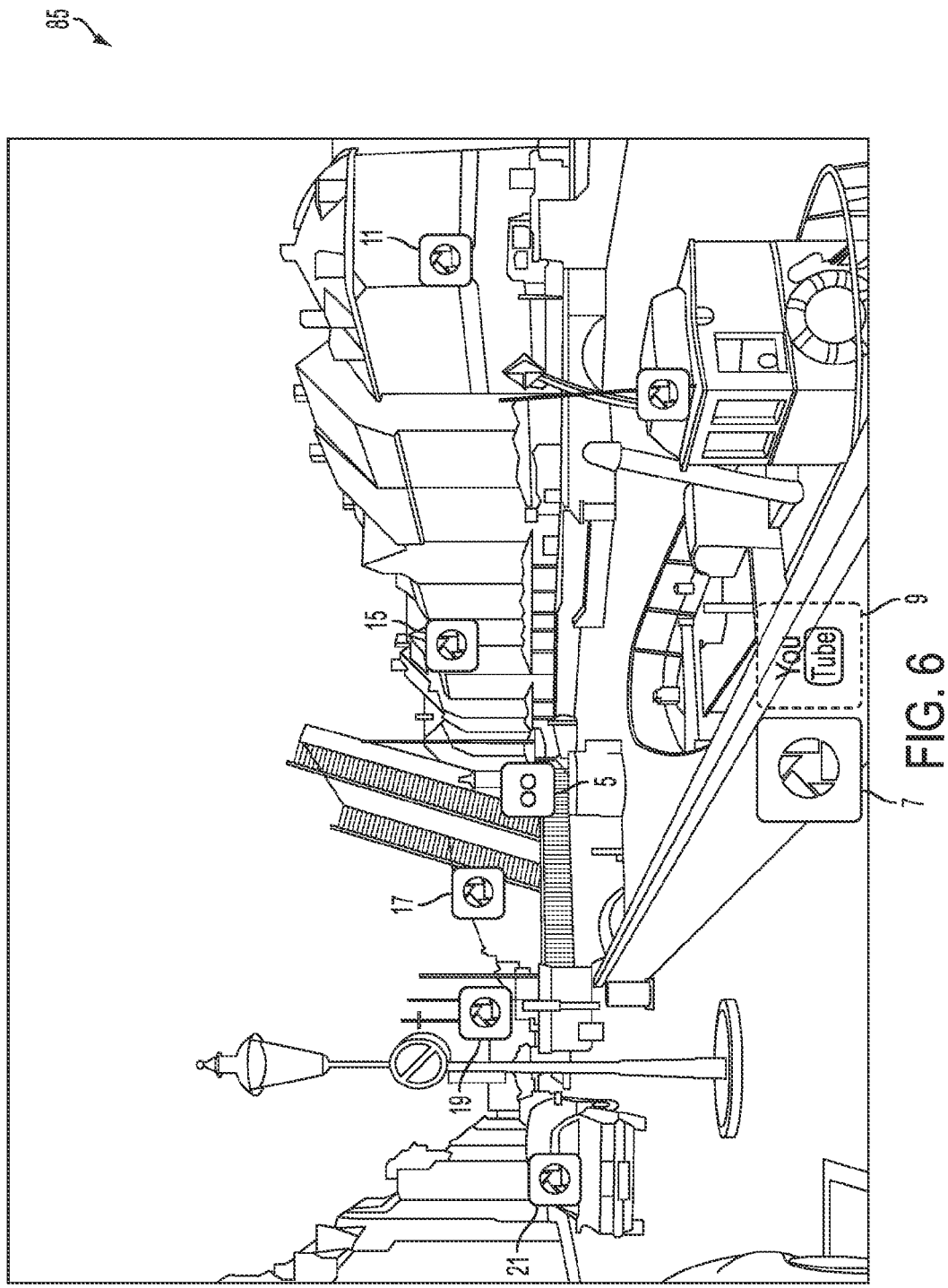
Figure 7:
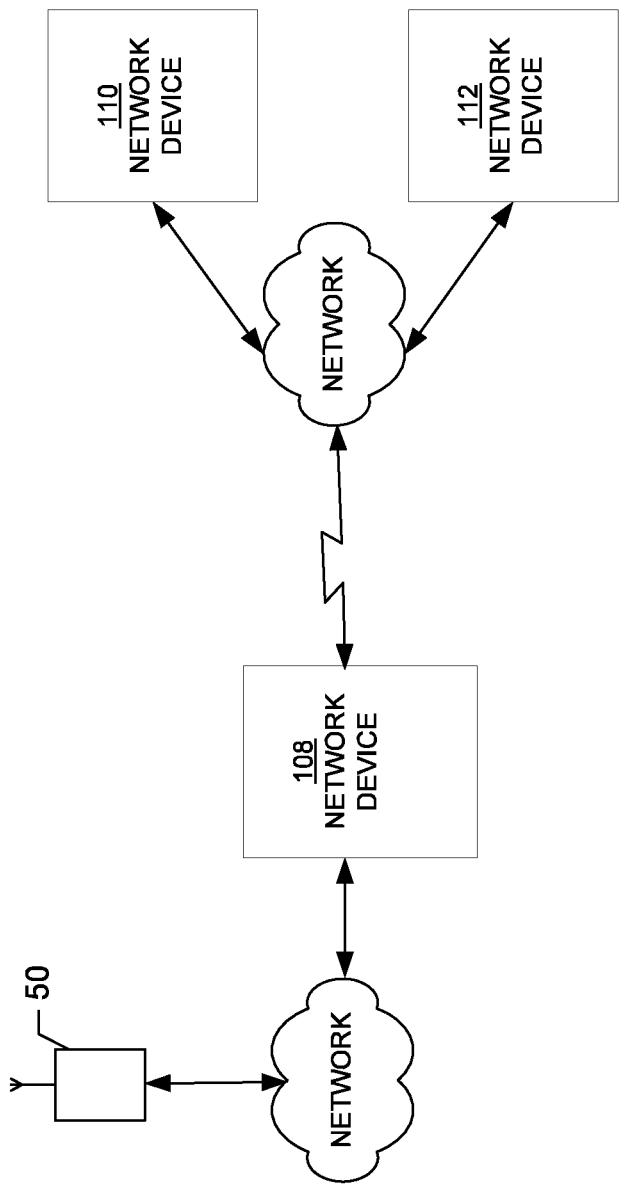
Figure 8:
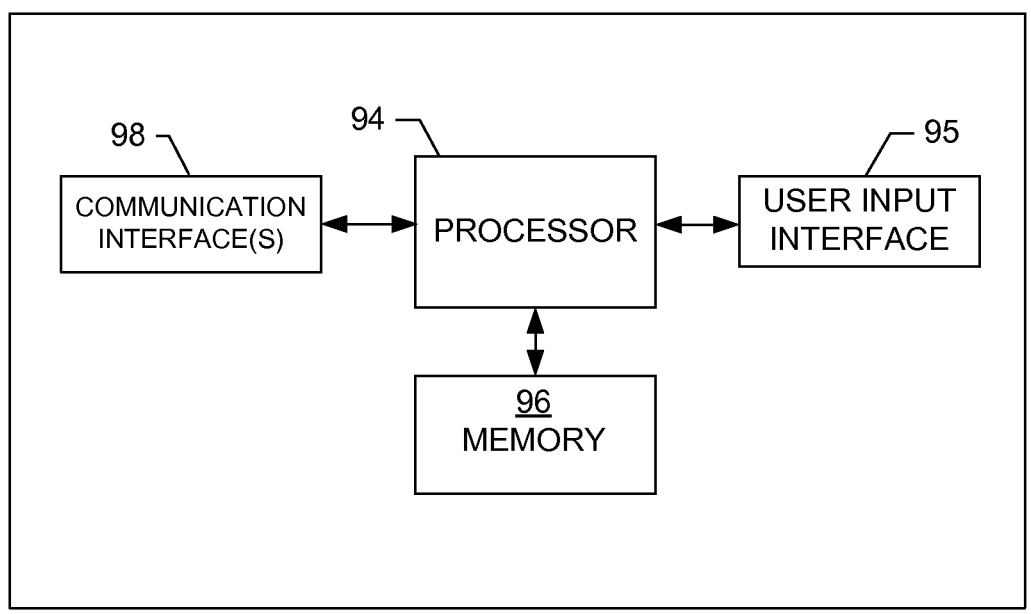
Figure 9:
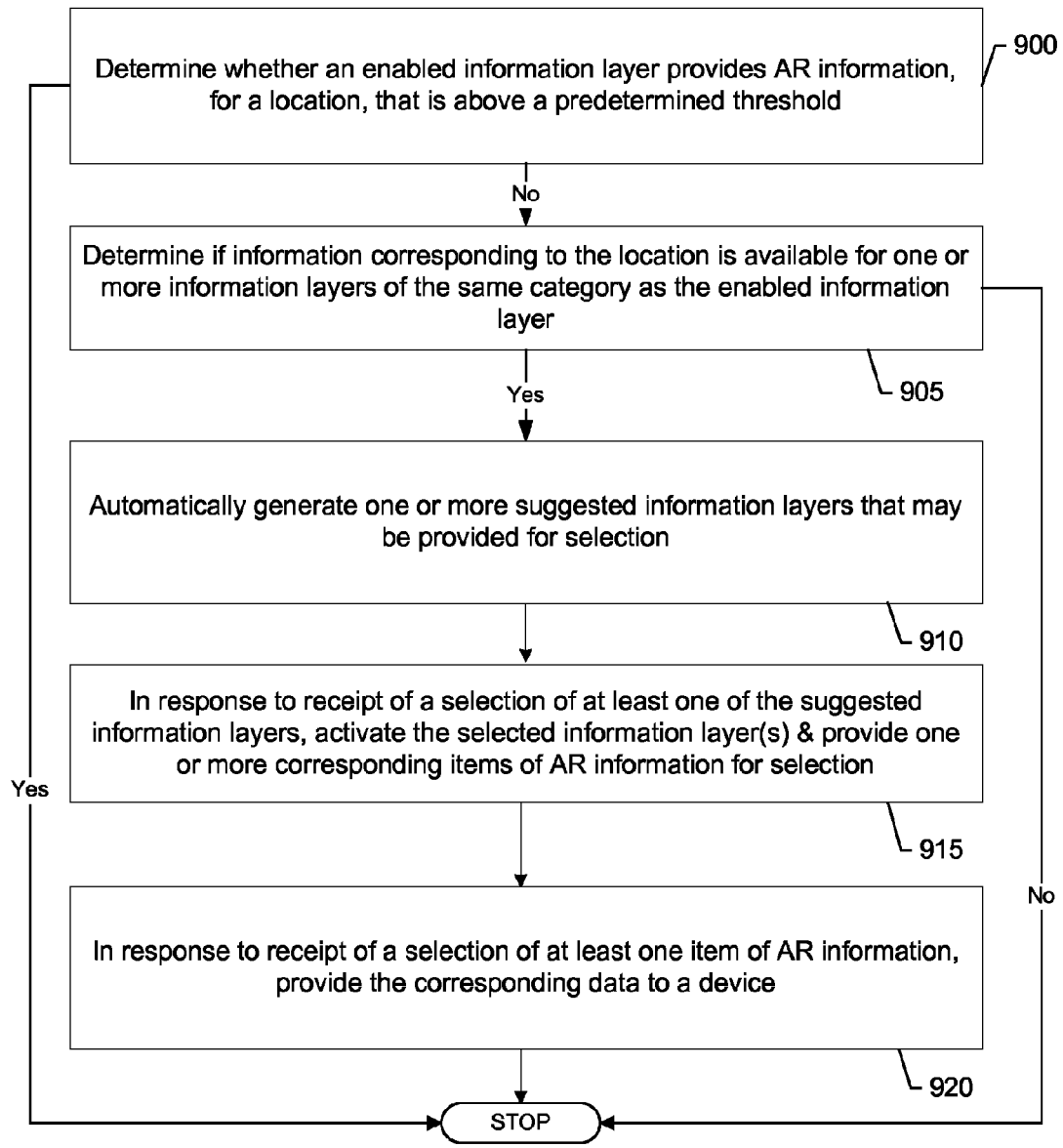

Having thus described some embodiments of the invention in general terms, reference will now be made to the accompanying drawings, which are not necessarily drawn to scale, and wherein:

FIG. 1 is a diagram of an augmented reality browser providing different information in a camera view of a device;

FIG. 2 is a diagram of an augmented reality browser providing very little information for a given information layer in a camera view of a device;

FIG. 3 is a schematic block diagram of a system according to an exemplary embodiment of the invention;

FIG. 4 is a schematic block diagram of an apparatus for automatically generating one or more suggested information layers in augmented reality according to an exemplary embodiment of the invention;

FIG. 5 is a diagram illustrating an example of automatically providing suggested information layers in a camera view of a device according to an exemplary embodiment of the invention;

FIG. 6 is a diagram of an example illustrating information in response to a selection of a suggested information layer in a camera view of a device according to an exemplary embodiment of the invention;

FIG. 7 is a schematic block diagram of a system according to an exemplary embodiment;

FIG. 8 is a schematic block diagram of a network entity according to an exemplary embodiment of the invention; and FIG. 9 illustrates a flowchart for automatically generating one or more suggested information layers in augmented reality according to an exemplary embodiment of the invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical or tangible storage medium (e.g., volatile or non-volatile memory device), may be differentiated from a "computer-readable transmission medium," which refers to an electromagnetic signal.

Also, as used herein a "layer(s)", "information layer(s)" or "layer(s) of information" may be a layer(s) of information which may be shown on a display. The layer(s) of information may be provided by one or more content providers and may correspond to items of virtual information (e.g., virtual objects). In this regard, the layer(s) of information may, but need not, be a layer of virtual objects (e.g., graphical elements such as icons, pictograms, etc.) in which each graphical element indicates information. The information of the information layer(s) may be associated with location information such as, for example, geo-coordinates (e.g., longitude, latitude, altitude coordinates) and any other suitable data. For instance, the items of virtual information may relate to receipt of location information indicating a current location of a device or a current location(s) of real world objects currently being shown by the device. In one embodiment, a layer of information may be information that is associated in such a way as to be displayed together as part of the same overlay. Different layers may be provided by different content providers and/or may correspond to different virtual objects.

For purposes of illustration and not of limitation, a layer of information may be a layer of icons (e.g., Wikipedia™ icons) associated with information (e.g., Wikipedia™ articles) provided by a content provider (e.g., Wikipedia™ website).

Additionally, as used herein, the term camera view angle or camera view field may refer to an angle for a camera that may be shown on a display. As referred to herein, the terms "information point(s)", "point of interest(s)" (POI(s)), "item(s) of augmented reality (AR) information", "AR information", "virtual information", "item(s) of virtual information" and similar terms may be used interchangeably to refer to a point(s) in space (e.g., a geo-coordinate(s) such as, for e.g., longitude, latitude, altitude coordinates) which contains or is associated with some information (e.g., text, audio data, media content such as for example an image(s), picture(s), video data, etc.). The information point(s), POI(s), item(s) of AR information, AR information, virtual information, or item(s) of virtual information may be marked on a display by a virtual object(s) (e.g., a graphical element(s) such as an icon(s), pictogram(s), etc.).

FIG. 3 illustrates a generic system diagram in which a device such as a mobile terminal 10 is shown in an exemplary communication environment. As shown in FIG. 3, an embodiment of a system in accordance with an example embodiment of the invention may include a first communication device (e.g., mobile terminal 10) and a second communication device 20 capable of communication with each other via a network 30. In one embodiment of the invention may further include one or more additional communication devices, one of which is depicted in FIG. 3 as a third communication device 25. In one embodiment, not all systems that employ an embodiment of the invention may comprise all the devices illustrated and/or described herein. While an embodiment of the mobile terminal 10 and/or second and third communication devices 20 and 25 may be illustrated and hereinafter described for purposes of example, other types of terminals, such as portable digital assistants (PDAs), pagers, mobile televisions, mobile telephones, gaming devices, laptop computers, cameras, video recorders, audio/video players, radios, global positioning system (GPS) devices, Bluetooth headsets, Universal Serial Bus (USB) devices or any combination of the aforementioned, and other types of voice and text communications systems, can readily employ an embodiment of the invention. Furthermore, devices that are not mobile, such as servers and personal computers may also readily employ an embodiment of the invention.

The network 30 may include a collection of various different nodes (of which the second and third communication devices 20 and 25 may be examples), devices or functions that may be in communication with each other via corresponding wired and/or wireless interfaces. As such, the illustration of FIG. 3 should be understood to be an example of a broad view of certain elements of the system and not an all inclusive or detailed view of the system or the network 30. Although not necessary, in one embodiment, the network 30 may be capable of supporting communication in accordance with any one or more of a number of First-Generation (1G), Second-Generation (2G), 2.5G, Third-Generation (3G), 3.5G, 3.9G, Fourth-Generation (4G) mobile communication protocols, Long Term Evolution (LTE), and/or the like. In one embodiment, the network 30 may be a point-to-point (P2P) network.

One or more communication terminals such as the mobile terminal 10 and the second and third communication devices 20 and 25 may be in communication with each other via the network 30 and each may include an antenna or antennas for transmitting signals to and for receiving signals from a base site, which could be, for example a base station that is a part of one or more cellular or mobile networks or an access point that may be coupled to a data network, such as a Local Area Network (LAN), a Metropolitan Area Network (MAN), and/or a Wide Area Network (WAN), such as the Internet. In turn, other devices such as processing elements (e.g., personal computers, server computers or the like) may be coupled to the mobile terminal 10 and the second and third communication devices 20 and 25 via the network 30. By directly or indirectly connecting the mobile terminal 10 and the second and third communication devices 20 and 25 (and/or other devices) to the network 30, the mobile terminal 10 and the second and third communication devices 20 and 25 may be enabled to communicate with the other devices or each other, for example, according to numerous communication protocols including Hypertext Transfer Protocol (HTTP) and/or the like, to thereby carry out various communication or other functions of the mobile terminal 10 and the second and third communication devices 20 and 25, respectively.

Furthermore, although not shown in FIG. 3, the mobile terminal 10 and the second and third communication devices 20 and 25 may communicate in accordance with, for example, radio frequency (RF), near field communication (NFC), Bluetooth (BT), Infrared (IR) or any of a number of different wireline or wireless communication techniques, including Local Area Network (LAN), Wireless LAN (WLAN), Worldwide Interoperability for Microwave Access (WiMAX), Wireless Fidelity (WiFi), Ultra-Wide Band (UWB), Wibree techniques and/or the like. As such, the mobile terminal 10 and the second and third communication devices 20 and 25 may be enabled to communicate with the network 30 and each other by any of numerous different access mechanisms. For example, mobile access mechanisms such as Wideband Code Division Multiple Access (W-CDMA), CDMA2000, Global System for Mobile communications (GSM), General Packet Radio Service (GPRS) and/or the like may be supported as well as wireless access mechanisms such as WLAN, WiMAX, and/or the like and fixed access mechanisms such as Digital Subscriber Line (DSL), cable modems, Ethernet and/or the like.

In an example embodiment, the first communication device (e.g., the mobile terminal 10) may be a mobile communication device such as, for example, a wireless telephone or other devices such as a personal digital assistant (PDA), mobile computing device, camera, video recorder, audio/video player, positioning device, game device, television device, radio device, or various other like devices or combinations thereof. The second communication device 20 and the third communication device 25 may be mobile or fixed communication devices. However, in one example, the second communication device 20 and the third communication device 25 may be servers, remote computers or terminals such as, for example, personal computers (PCs) or laptop computers.

In an example embodiment, the network 30 may be an ad hoc or distributed network arranged to be a smart space. Thus, devices may enter and/or leave the network 30 and the devices of the network 30 may be capable of adjusting operations based on the entrance and/or exit of other devices to account for the addition or subtraction of respective devices or nodes and their corresponding capabilities. In an example embodiment, one or more of the devices in communication with the network 30 may employ a layer suggestion module (e.g., layer suggestion module 78 of FIG. 4). The layer suggestion module may generate one or more suggested information layers that may be presented to a display (e.g., display 85 of FIG. 4) of a device (e.g. mobile terminal 10). The suggested information layers may be associated with information (e.g., geo-coded data) corresponding to the current location of a device. In an example embodiment, the suggested information layers may, but need not, be presented by the layer suggestion module as virtual objects (e.g., icons) on camera view of a display. Upon selection of one or more of the virtual objects information associated with the virtual objects may be provided to and shown on the display.

In an example embodiment, the mobile terminal 10 and the second and third communication devices 20 and 25 may be configured to include the layer suggestion module. However, in an alternative embodiment the mobile terminal 10 may include the layer suggestion module and the second and third communication devices 20 and 25 may be network entities such as servers or the like that are configured to communicate with each other and/or the mobile terminal 10. For instance, in an example embodiment, the second communication device 20 may be a dedicated server (or server bank) associated with a particular information source or service (e.g., a localized augmented reality service, a mapping service, a search service, a media provision service, etc.) or the second communication device 20 may be a backend server associated with one or more other functions or services. As such, the second communication device 20 may represent a potential host for a plurality of different services or information sources. In one embodiment, the functionality of the second communication device 20 is provided by hardware and/or software components configured to operate in accordance with known techniques for the provision of information to users of communication devices. However, at least some of the functionality provided by the second communication device 20 is information provided in accordance with example an embodiment of the invention.

In an example embodiment, the second communication device 20 may host an apparatus for providing a localized augmented reality service and/or may host a provision service that provides information (e.g., panoramic images) to a device (e.g., mobile terminal 10) practicing an embodiment of the invention. The localized augmented reality service may provide items of virtual information about an environment displayed in a camera view of a device (e.g., mobile terminal 10) and the real world objects in the environment.

The third communication device 25 may also be a server providing a number of functions or associations with various information sources and services (e.g., a localized virtual/augmented reality service, a mapping service, a search service, a media provision service, etc.). In this regard, the third communication device 25 may host an apparatus for providing virtual/augmented reality information to the second communication device 20 to enable the second communication device to provide the virtual/augmented reality information to a device (the mobile terminal 10) practicing an embodiment of the invention. The virtual/augmented reality information provided by the third communication device 25 to the second communication device 20 may provide information about an environment displayed in a camera view of a device (e.g., mobile terminal 10) and the objects in the environment.

As such, in one embodiment, the mobile terminal 10 may itself perform an example embodiment. In another embodiment, the second and third communication devices 20 and 25 may facilitate (e.g., by the provision of augmented reality information) operation of an example embodiment at another device (e.g., the mobile terminal 10). In still one other example embodiment, the second communication device 20 and the third communication device 25 may not be included at all.

FIG. 4 illustrates a schematic block diagram of an apparatus for automatically generating one or more suggested information layers in augmented reality according to an example embodiment of the invention. An example embodiment of the invention will now be described with reference to FIG. 4, in which certain elements of an apparatus 50 are displayed. The apparatus 50 of FIG. 4 may be employed, for example, on the mobile terminal 10 (and/or the second communication device 20 or the third communication device 25). Alternatively, the apparatus 50 may be embodied on a network device of the network 30. However, the apparatus 50 may alternatively be embodied at a variety of other devices, both mobile and fixed (such as, for example, any of the devices listed above). In some cases, an embodiment may be employed on a combination of devices. Accordingly, an embodiment of the invention may be embodied wholly at a single device (e.g., the mobile terminal 10), by a plurality of devices in a distributed fashion (e.g., on one or a plurality of devices in a P2P network) or by devices in a client/server relationship. Furthermore, it should be noted that the devices or elements described below may not be mandatory and thus some may be omitted in a certain embodiment.

Referring now to FIG. 4, the apparatus 50 may include or otherwise be in communication with a processor 70, a user interface 67, a communication interface 74, a memory device 76, a display 85, an orientation module 71, a layer suggestion module 78, a positioning sensor 72 and a camera module 36. The memory device 76 may include, for example, volatile and/or non-volatile memory. For example, the memory device 76 may be an electronic storage device (e.g., a computer readable storage medium) comprising gates configured to store data (e.g., bits) that may be retrievable by a machine (e.g., a computing device like processor 70). In an example embodiment, the memory device 76 may be a tangible memory device that is not transitory. The memory device 76 may be configured to store information, data, files, applications, instructions or the like for enabling the apparatus to carry out various functions in accordance with an example embodiment of the invention. For example, the memory device 76 could be configured to buffer input data for processing by the processor 70. Additionally or alternatively, the memory device 76 could be configured to store instructions for execution by the processor 70. As yet another alternative, the memory device 76 may be one of a plurality of databases that store information and/or media content (e.g., pictures, videos, etc.).

The memory device 76 may store geo-coded information that may be associated with location information corresponding to coordinates such as, for example, latitude, longitude and/or altitude coordinates of real-world objects. The geo-coded information may be evaluated by the processor 70 and/or layer suggestion module 78 and data associated with the geo-coded information may be provided to a camera view of a display. In an example embodiment, the processor 70 and/or layer suggestion module 78 may provide the information associated with the geo-coded information to the camera view of the display, in response to determining that the location of the real-world objects shown on the camera view of the display correspond to the location information of the geo-coded information.

The processor 70 may be embodied in a number of different ways. For example, the processor 70 may be embodied as one or more of various processing means such as a coprocessor, microprocessor, a controller, a digital signal processor (DSP), processing circuitry with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, or the like. In an example embodiment, the processor 70 may be configured to execute instructions stored in the memory device 76 or otherwise accessible to the processor 70. As such, whether configured by hardware or software methods, or by a combination thereof, the processor 70 may represent an entity (e.g., physically embodied in circuitry) capable of performing operations according to an embodiment of the invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and operations described herein when the instructions are executed. However, in some cases, the processor 70 may be a processor of a specific device (e.g., a mobile terminal or network device) adapted for employing an embodiment of the invention by further configuration of the processor 70 by instructions for performing the algorithms and operations described herein. The processor 70 may include, among other things, a clock, an arithmetic logic unit (ALU) and logic gates configured to support operation of the processor 70.

In an example embodiment, the processor 70 may be configured to operate a connectivity program, such as a browser, augmented reality (AR) browser, Web browser or the like. In this regard, the connectivity program may enable the apparatus 50 to transmit and receive Web content, such as for example location-based content or any other suitable content, according to a Wireless Application Protocol (WAP), for example. It should be pointed out that the AR browser may be a user interface that facilitates navigation of objects in a view of a physical real-world environment with information such as, for example one or more information layers that are added, augmented or altered in some fashion by providing data about the surrounding real world objects. The information layers may, but need not, be viewed as on top of the real world view. The AR browser may be utilized by the processor 70 to facilitate execution of one or more augmented reality applications. It should be pointed out that the processor 70 may also be in communication with a display 85 and may instruct the display to illustrate any suitable information, data, content (e.g., media content) or the like.

Meanwhile, the communication interface 74 may be any means such as a device or circuitry embodied in either hardware, a computer program product, or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network (e.g., network 30). In fixed environments, the communication interface 74 may alternatively or also support wired communication. As such, the communication interface 74 may include a communication modem and/or other hardware/software for supporting communication via cable, digital subscriber line (DSL), universal serial bus (USB), Ethernet or other mechanisms.

The user interface 67 may be in communication with the processor 70 to receive an indication of a user input at the user interface 67 and/or to provide an audible, visual, mechanical or other output to the user. As such, the user interface 67 may include, for example, a keyboard, a mouse, a joystick, a display, a touch screen, a microphone, a speaker, or other input/output mechanisms. In an example embodiment in which the apparatus is embodied as a server or some other network devices, the user interface 67 may be limited, remotely located, or eliminated. The processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

The apparatus 50 includes a media capturing element, such as camera module 36. The camera module 36 may include a camera, video and/or audio module, in communication with the processor 70 and the display 85. The camera module 36 may be any means for capturing an image, video and/or audio for storage, display or transmission. For example, the camera module 36 may include a digital camera capable of forming a digital image file from a captured image. As such, the camera module 36 includes all hardware, such as a lens or other optical component(s), and software necessary for creating a digital image file from a captured image. Alternatively, the camera module 36 may include only the hardware needed to view an image, while a memory device (e.g., memory device 76) of the apparatus 50 stores instructions for execution by the processor 70 in the form of software necessary to create a digital image file from a captured image. In an example embodiment, the camera module 36 may further include a processing element such as a co-processor which assists the processor 70 in processing image data and an encoder and/or decoder for compressing and/or decompressing image data. The encoder and/or decoder may encode and/or decode according to a Joint Photographic Experts Group, (JPEG) standard format or another like format. In some cases, the camera module 36 may provide live image data to the display 85. In this regard, the camera module 36 may facilitate or provide a camera view to the display 85 to show live image data, still image data, video data, or any other suitable data. Moreover, in an example embodiment, the display 85 may be located on one side of the apparatus 50 and the camera module 36 may include a lens positioned on the opposite side of the apparatus 50 with respect to the display 85 to enable the camera module 36 to capture images on one side of the apparatus 50 and present a view of such images to the user positioned on the other side of the apparatus 50.

In addition, the apparatus 50 may include a positioning sensor 72. The positioning sensor 72 may include, for example, a global positioning system (GPS) sensor, an assisted global positioning system (Assisted-GPS) sensor, a Bluetooth (BT)-GPS mouse, other GPS or positioning receivers or the like. However, in one example embodiment, the positioning sensor 72 may include a pedometer or inertial sensor. In this regard, the positioning sensor 72 may be capable of determining a location of the apparatus 50, such as, for example, longitudinal and latitudinal directions of the apparatus 50, or a position relative to a reference point such as a destination or start point. The positioning sensor 72 may also be capable of determining an altitude of the apparatus 50 and use the altitude information in determining the location of the apparatus 50. Information from the positioning sensor 72 may then be communicated to a memory of the apparatus 50 or to another memory device to be stored as a position history or location information. In this regard, for example, the position history may define a series of data points corresponding to positions of the apparatus 50 at respective times. Various events or activities of the apparatus 50 may also be recorded in association with position history or location information provided by the positioning sensor 72.

In an example embodiment, the apparatus 50 may further include (or be in communication with) an orientation module 71. The orientation module 71 may be any means such as a device or circuitry embodied in either hardware or a combination of hardware and software that is configured to determine the orientation of apparatus 50 and/or of the field of view of the camera module 36 of the apparatus 50. The orientation module 71 may be in communication with the layer suggestion module 78.

Orientation module 71 may be configured to determine the orientation of apparatus 50 relative to a reference. In some cases, the reference may be a particular direction, such as North or another cardinal direction. However, other references could also be employed. As such, in one embodiment, the orientation module 71 may include a compass or other orientation sensor configured to determine the heading of the apparatus 50 or direction that the lens of the camera module 36 is pointing. The direction or heading may be determined in terms of degrees (e.g., 0 to 360 degrees) offset from the reference. In some cases, the reference may be fixed (e.g., a fixed directional reference), while in other cases, the reference may be a reference of opportunity such as a prominent feature in an image captured by the camera module or simply an initial orientation. In one embodiment, the orientation module 71 may include an electronic compass, a horizon sensor, gravity sensor, accelerometer, gyroscope, magnetometer and/or the like or any other sensor that may be useful in determining orientation information.

In an example embodiment, the processor 70 may be embodied as, include or otherwise control a layer suggestion module 78. As such, in one embodiment, the processor 70 may be said to cause, direct or control the execution or occurrence of the various functions attributed to the layer suggestion module 78, as described herein. The layer suggestion module 78 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the layer suggestion module, as described herein. Thus, in examples in which software is employed, a device or circuitry (e.g., the processor 70 in one example) executing the software forms the structure associated with such means.

In an example embodiment, the layer suggestion module 78 may be configured to receive position information indicative of the current location (or position) of the apparatus 50 (e.g., from the positioning sensor 72) or a current location (or position) of real world objects currently being shown by the apparatus 50. The layer suggestion module may also be configured to receive orientation information indicative of an orientation of the apparatus 50 with respect to the current location (e.g., from the orientation module 71). In other words, the layer suggestion module 78 may also receive orientation information indicative or descriptive of the orientation of the mobile terminal 10 (relative to a reference) so that a field of view that the apparatus 50 would be expected to have at the current location may be determined based on the current location and the orientation information. The layer suggestion module 78 may then retrieve (or request) augmented/virtual reality information (also referred to herein as AR information) from an AR repository 84 that correlates to both the current location and the orientation information. As referred to herein, the AR information (also referred to herein interchangeably as virtual information) may include, but is not limited to geo-coded information corresponding to location information (e.g., longitude, latitude and/or altitude coordinates) of real world objects (e.g., building, landmarks, etc.) and may include one or more information layers. The real world objects may be associated with objects in a current location of the apparatus 50 shown in a camera view of the camera module 36 or display 85. The information layers may be associated with one or more virtual objects (e.g., icons, pictograms, images, or the like). The information layers may also correspond to information, content, data or the like that may, but need not, be provided by one or more content providers (e.g., service providers such as, for e.g., Wikipedia™, Twitter™, YouTube™, Picasa™, etc.).

In an example embodiment, the AR repository 84 may be a portion of the memory device 76 or may be an external memory or database that includes a plurality of AR information. Alternatively, the AR repository 84 may be collocated with the layer suggestion module 78

It should be pointed out that AR repository 84 may store information associated with one or more information layers, AR information (e.g., items of AR information) as well as any other suitable data. The AR information may, but need not, include geo-coded information that contains or is associated with data such as, for example, text, audio, images, pictures, photographs, video data, etc. The geo-coded information may include geo-coordinates corresponding to location information such as, for example, longitude, latitude and/or altitude coordinates. In an example embodiment, the images stored in the AR repository 84 may be panoramic images that are associated with particular locations and orientations.

In one embodiment, the layer suggestion module 78 may select AR information from the AR repository 84 after receipt of the location information and the orientation information. However, in one other embodiment, some images may be pre-fetched based on location information, perhaps before orientation information is known or before specific AR information is requested. The pre-fetched AR information may be received from a remote source and stored locally so that computation resource consumption may be reduced when searching for specific AR information to match the current location and orientation information when it is time to retrieve AR information since a smaller set of AR information may need to be dealt with during the search operation.

The layer suggestion module 78 of an example embodiment may utilize the location information (provided by the positioning sensor 72) and/or the orientation information (provided by the orientation module 71) to automatically generate one or more suggested information layers (e.g. virtual objects (e.g., icons corresponding to information of a content provider)). The suggested information layers may be associated with information corresponding to real world objects in the environment of the apparatus 50 that may be shown in a camera view of camera module 36 and/or display 85. The suggested information layers may, but need not, be provided in a list. The suggested information layers may be optional layers of icons for selection by a user.

In an example embodiment, the suggested layers may be provided by the layer suggestion module 78 to a camera view of the display 85 for selection by the user when a currently enabled information layer does not provide AR information for display above a predetermined threshold (e.g., 30 items (e.g., icons) of AR information). In other words, when the AR information corresponding to a currently enabled information layer (e.g., the user has currently selected the Wikipedia™ information layer for providing virtual objects associated with Wikipedia™ icons) is below the predetermined threshold, the layer suggestion module 78 may automatically provide the suggested layers to the camera view of the display 85 for selection. On the other hand, when the AR information for a currently enabled information layer is above the predetermined threshold, the layer suggestion module 78 may not provide the suggested layers to the camera view of the display 85 for selection since enough AR information may be provided for the user's satisfaction.

In situations in which the layer suggestion module 78 provides the suggested information layers to the camera view of the display 85, the user of the apparatus 50 may select one of the suggested information layers. In response to selection of one of the suggested information layers (e.g., virtual objects of a content provider), information associated with the selected information layer may be provided to and shown by the camera view of the display 85. It should be pointed out that the AR information of the suggested layers provided by the layer suggestion module 78 may correspond to the same category (e.g., pictures or images) of AR information of an enabled information layer when the AR information of the enabled information layer is below the predetermined threshold, as described more fully below.

An example embodiment of the invention will now be described with reference to FIG. 5. For purposes of illustration and not of limitation, consider an example in which the user of apparatus 50 points the camera module 36 to a real-world environment to capture an image and/or live video that may be shown on the camera view of the display 85. In this regard, the positioning sensor 72 may provide location information (e.g., longitude, latitude, and/or altitude coordinates) to the layer suggestion module and the orientation module 71 may provide orientation information (e.g., directional information) to the layer suggestion module 78 and/or the processor 70 based on the current location of the apparatus or real world objects being shown in the camera view of the display 85.

Presume further that the user of the apparatus 50 utilized the user interface 67 (e.g., a pointing device of the user interface 67) to select an information layer in order to enable the information layer. In this example, the user may have utilized the user interface 67 to enable the corresponding information layer prior to pointing the camera module 36 at the real-world environment. The user may have selected the information layer from a menu, folder, button, or the like provided to the display 85. In this example embodiment, the user has selected and enabled an information layer corresponding to flickr.com, which is provided by content provider Flickr™. The content provider Flickr™ may provide geotagged images and/or video services.

The geotagged images or videos may be associated with location information (e.g., longitude, latitude and/or altitude coordinates) and may be provided to the camera view of the display 85 when the location information of the real world objects that are shown in the camera view of the display 85 correspond to the location information of the geotagged images or videos. In other words, when the location information of the real world objects shown in the camera view of the display 85 matches or is substantially similar to the location information of one or more the geotagged images or videos provided by Flickr, the corresponding geotagged image(s) or videos may also be provided to the display 85.

Based on the receipt of the location information and/or the orientation information from the positioning sensor 72 and the orientation module 71, respectively, the layer suggestion module 78 may access the AR repository 84 to determine whether there is any AR information (e.g., geotagged images and/or video, etc.) for the enabled information layer (e.g., flickr.com) that corresponds to the objects in the real world environment shown in the camera view of the display 85. In this example embodiment, the layer suggestion module 78 determines that there was one item of AR information with location information related to the location information of the real world environment shown in the camera view of the display 85. In this regard, the layer suggestion module 78 may provide the item of AR information 5 (e.g., an icon provided by flickr.com) related to the location information of the real world environment to the display 85 so that it may be shown.

The layer suggestion module 78 may determine that the AR information corresponding to the enabled information layer is below the predetermined threshold (e.g., 30 items of AR information, 40 items of AR information or any suitable threshold) since only one item of AR information is shown on the display 85. As such, the layer suggestion module 78 may automatically generate one or more suggested information layers to provide to the display 85 for selection. In this regard, the layer suggestion module 78 may check the AR repository 84 to determine whether there is geo-coded AR information that relates to any other information layers corresponding to the location information of the real world environment shown in the camera view of the display 85. In an example embodiment, the layer suggestion module may check the AR repository 84 for AR information related to information layers in the same category as the information layer enabled by the user. It should be pointed out that the layer suggestion module 78 may categorize the AR information by analyzing a description of data associated with the AR information that may be generated by the provider of the data. In this example, the user enabled an information layer such as flickr.com which may relate to the provision of one or more images, pictures or videos in augmented reality.

As such, the layer suggestion module 78 may generate one or more suggested information layers in the same category as the category of the information layer selected and enabled by the user. For example, the layer suggestion module 78 may determine that there is geocoded information (e.g., latitude, longitude and/or altitude coordinates) corresponding to the location information (e.g., latitude, longitude and/or altitude coordinates) of the real world environment shown in the camera view of the display for information layers corresponding to content providers such as for example Picasa™ and YouTube™. In this regard, the layer suggestion module 78 may automatically suggest the Picasa™ information layer 7 and the YouTube™ information layer 9 to the user, by providing the information layers 7 and 9 to the display 85 for selection by the user of the apparatus 50 as shown in FIG. 5. The Picasa™ and YouTube™ information layers 7, 9 may relate to provision of images, pictures, videos or the like and as such the layer suggestion module 78 may determine that the AR information of the Picasa™ information layer 7 and the YouTube™ information layer 9 are in the same category as the Flickr™ information layer 5 which also relates to services for the provision of images, pictures, videos, or the like.

The suggested information layers 7 and 9 provided to the display 85 by the layer suggestion module 78 may be semi-transparent virtual objects such as for example, icons, pictograms or any other suitable graphical elements. The virtual objects of the information layers 7 and 9 may be displayed semi-transparently, as shown in FIG. 5, to indicate that the suggested information layers 7 and 9 are not yet activated. In an example embodiment, the information layers 7 and 9 may be activated upon selection by the user of the apparatus 50. In this regard, the user may utilize the user interface 67 (e.g., a pointing device, etc.) to select one or more of the information layers 7 and 9 shown on the display 85. Alternatively or additionally, the user may utilize a finger or the like to select one or more of the information layers 7 and 9, in an embodiment in which the display 85 may be configured as a touch display or touch screen.

In this example, the user may select the Picasa™ information layer 7 (e.g., the Picasa™ icon) to activate the Picasa™ information layer 7 and to determine whether the AR information associated with the Picasa™ information layer is relevant or of interest to the user. The user of the apparatus 50 may access a user setting of the layer suggestion module 78 to activate the feature for the generation of the suggested information layers. Additionally, the user may access a user setting to deactivate the feature for the generation of the suggested information layers. In this regard, the layer suggestion module 78 may not suggest information layers for selection by the user, even though a currently enabled information layer (e.g., Flickr™ information layer 5) is providing little or no content (e.g., AR information).

Referring now to FIG. 6, an example embodiment of graphical elements associated with a selection of a suggested information layer overlaid on real world objects is provided. FIG. 6 shows that the user selected the Picasa™ information layer 7 suggested by the layer suggestion module 78 in the example above with respect to FIG. 5. As shown in FIG. 6, in response to a selection of a suggested information layer(s) (e.g., Picasa™ information layer), the layer suggestion module 78 may provide corresponding items of AR information 11, 15, 17, 19 and 21 to the camera view of the display 85. In this example, the items of AR information 11, 15, 17 and 19 provided to the camera view of the display 85 may, but need not, be one or more virtual objects (e.g., graphical elements such as icons, pictograms, etc.) associated with the selection of the suggested Picasa™ information layer 7. As shown in FIG. 6, the layer suggestion module 78 may provide the suggested Picasa™ information layer 7 to the camera view of display 85 in a non-transparent manner in response to a selection of the Picasa™ information layer 7. Provision of the selected Picasa™ information layer 7 in a non-transparent manner may indicate that the Picasa™ information layer 7 is active. The items of AR information associated with the Picasa™ information layer 7 may also be provided to the camera view of the display 85 by the layer suggestion module 78 indicating that the items of information are active and may be selected for retrieval of data or content associated with items of AR information 11, 15, 17, 19 and 21.

The items of AR information 11, 15, 17, 19 and 21 may be retrieved by the layer suggestion module 78 from a memory such as, for example, AR repository 84. In this regard, layer suggestion module 78 may determine that the items of AR information 11, 15, 17, 19 and 21 may correspond to data that is associated in part with geocoded content that corresponds to the current location information of the real world environment shown in the camera view of the display 85. For example, the layer suggestion module 78 may determine that the items of AR information 11, 15, 17, 19 and 21 have coordinates (e.g., latitude, longitude and/or altitude) that are the same as or close to the coordinates (e.g., latitude, longitude and/or altitude) of the real world objects being shown in the display 85.

Selection of any of the items of AR information 11, 15, 17, 19 and 21 may enable or trigger the layer suggestion module 78 to provide the information associated with the selected item(s) of information 11, 15, 17, 19 and 21 to the camera view of the display 85. The items of AR information may be selected by the user via the user interface 67 (e.g., a pointing device of the user interface 67) or by using a finger or the like in an embodiment in which the display 85 includes a touch display or touch screen, in the manner described above.

In this regard, the content or data (e.g., an article about the real world objects shown in the display 85) associated with any selected item(s) of AR information 11, 15, 17, 19 and 21 may be provided to the camera view of the display 85. In an example embodiment, the content associated with the selected item(s) of AR information 11, 15, 17, 19 and 21 may, but need not, be superimposed or overlaid on corresponding areas of the view of the real world objects shown in the camera view of the display 85. In an alternative example embodiment, the content associated with the selected item(s) of information 11, 15, 17, 19 and 21 may be shown on the display 85 by itself without the view of the real objects shown in the camera view. This may be useful when the data associated with the selected item(s) of AR information is too large to view superimposed on the live image(s)/video of the real world objects being captured by the camera module 36.

It should be pointed out that the layer suggestion module 78 may operate in an offline mode and in an online mode. In the offline mode, the apparatus 50 may not have a connection with network 30 in which to access AR information from a remote source such as for example a network device (e.g., a server (e.g., second communication device 20)). In this regard, the layer suggestion module 78 may obtain information associated with one or more suggested information layers and corresponding items of AR information from the AR repository 84. In this regard, the information associated with the suggested information layers and the items of AR information may be preloaded in the AR repository of the memory device 76. Additionally, the information associated with the suggested information layers and the items of AR information may be downloaded via another device (e.g., personal computer) via the network 30 and may be transferred (e.g., via a USB memory device) to the apparatus 50 and stored in the memory device 76.

In the online mode, the apparatus 50 may be able to communicate via the network 30 with one or more devices (e.g., second and third communication devices 20 and 25) and obtain information associated with one or more information layers that may be suggested to the user of the apparatus 50 as well as corresponding items of AR information. For example, as shown in FIG. 7, the apparatus 50 may be able to communicate with a designated network device 108 (e.g., a server (e.g., second communication device 20)) for receipt of information associated with one or more information layers that may be suggested to the user and/or corresponding items of AR information. In this regard, the layer suggestion module 78 may send a query to the network device 108 requesting information associated with one or more information layers and corresponding items of information. The query may include location information provided by the positioning sensor 72 to identify a current location of the apparatus 50 or a location of real world objects shown in the camera view of the display 85.

In response to receipt of the query, the network device 108 may analyze one of its memories (e.g., memory 96 of FIG. 8) to determine whether it has any information associated with information layers (e.g., information layers provided by content providers such as Wikipedia™, Twitter™, Picasa™, etc.) and corresponding AR information that corresponds to the location information provided by the layer suggestion module 78 of the apparatus 50. When the network device 108 determines that it has information pertaining to information layers and corresponding AR information that is associated with the location information, the network device 108 may send this information to the layer suggestion module 78. The layer suggestion module 78 may then utilize the received information to automatically suggest one or more information layers to the camera view of the display 85 and upon receipt of a selection of one or more of the suggested information layers, the layer suggestion module 78 may provide one or more corresponding items of AR information to the display 85.

On the other hand, when the network device 108 determines that it does not have any information relevant to the location information provided in the query, the network device 108 may send a query with the location information to one or more other network devices 110, 112 (e.g., third communication device 25). The query sent by the network device 108 may also include a request for information associated with the information layers and corresponding items of AR information that is desired by the layer suggestion module 78. In response to receipt of the information layer(s) data and AR information from one or more of the network devices 110, 112, the network device 108 may send the received information to the layer suggestion module 78 which may use the information to suggest information layers in the manner described above.

A benefit of obtaining the information for suggesting one or more information layers and corresponding items of AR information for one or more network devices is that the bandwidth used between the apparatus 50 and respective network device(s) may be minimized to only send necessary information. For example, if the apparatus 50 communicates with the network devices 110, 112 directly for information relevant to information layers and corresponding items of AR information, such communications may require a much larger bandwidth, since the apparatus may have to generate all of the queries to network devices 110, 112. The responses to queries from the network devices 110, 112 in many cases may contain a lot more information than required and all this information may have to be sent to the apparatus 50, before the apparatus 50 could filter the information.

As such, it may be beneficial for the apparatus 50 to communicate with a designated network device for receipt of information that may be used to automatically suggest one or more information layers and provide corresponding items of AR information, in instances in which the apparatus 50 may have a connection with the network (e.g., network 30).

Referring now to FIG. 8, a block diagram of an example embodiment of a network entity, such as, for example, network devices 108, 110 and 112 of FIG. 7 are provided. As shown in FIG. 8, the network entity (e.g., a server) generally includes a processor 94 and an associated memory 96. The memory 96 may comprise volatile and/or non-volatile memory, and may store content, data and/or the like. The memory 96 may store client applications, instructions, and/or the like for the processor 94 to perform the various operations of the network entity.

The processor 94 may also be connected to at least one communication interface 98 or other means for displaying, transmitting and/or receiving data, content, and/or the like. The user input interface 95 may comprise any of a number of devices allowing the network entity to receive data from a user, such as a keypad, a touch display, a joystick or other input device. In this regard, the processor 94 may comprise user interface circuitry configured to control at least some functions of one or more elements of the user input interface. The processor and/or user interface circuitry of the processor may be configured to control one or more functions of one or more elements of the user interface through computer program instructions (e.g., software and/or firmware) stored on a memory accessible to the processor (e.g., volatile memory, non-volatile memory, and/or the like).

The network entity may receive one or more queries from a device (e.g., apparatus 50 or network device 108 in one embodiment) for information corresponding to information layers and corresponding items of AR information. The queries may include location information indicating the current location of the apparatus 50 or location information associated with real world objects in a camera view of a display (e.g., display 85). In response to retrieving relevant information from memory 96, the processor 94 of the network entity may facilitate sending of the retrieved information to a network device which may send the information to the apparatus 50. Alternatively, the processor 94 may directly send the retrieved information to the apparatus 50, so that the layer suggestion module 78 may use the information to automatically generate one or more suggested information layers and provide corresponding items of AR information to a display, in the manner described above.

Referring now to FIG. 9, an example embodiment of a flowchart for automatically generating one or more suggested information layers in augmented reality is provided. At operation 900, an apparatus 50 may include means, such as the layer suggestion module 78, the processor 70 and/or the like, for determining whether an enabled information layer(s) (e.g. Flickr™ information layer 5) provides AR information above a predetermined threshold (e.g., 30 items of AR information (e.g., icons)). The process may end when the means, such as the layer suggestion module 78, the processor 70 and/or the like of apparatus 50 determines that the item(s) of AR information for the enabled information layer(s) is above the predetermined threshold. At operation 905, when the means, such as the layer suggestion module 78, the processor 70 and/or the like of apparatus 50, determines that the item(s) of AR information for the enabled information layer(s) is below the predetermined threshold, the layer suggestion module 78, the processor 70 and/or the like may determine whether information (e.g., AR information) corresponding to the current location is available for one or more information layers of the same category as the enabled information layer(s).

At operation 910, in response to the means, such as the layer suggestion module 78, the processor 70 and/or the like of the apparatus 50 determining that information is available for one or more information layers of the same category as the enabled information layer(s), the layer suggestion module 78, the processor 70 and/or the like may automatically suggest one or more of the information layers (e.g., Picasa™ information layer 7 and/or YouTube™ information layer 9) that may be provided for selection. In an example embodiment, the apparatus 50 may include means, such as layer suggestion module 78, processor 70 and/or the like, for providing the suggested information layers to a device (e.g., display 85) for selection. The process may end when the means, such as the layer suggestion module 78, processor 70 and/or the like of the apparatus 50 determines that information is unavailable for one or more information layers of the same category as the enabled information layer(s).

At operation 915, in response to receipt of a selection of one or more of the suggested information layers, the apparatus 50 may include means, such as the layer suggestion module 78, the processor 70 and/or the like, for activating the selected information layers and may provide one or more corresponding items of AR information (e.g., items of AR information 11, 15, 17, 19 and 21) for selection. The corresponding items of AR information may be provided to the camera view of the display (e.g., display 85) for selection, in the manner described above.

At operation 920, in response to receipt of a selection of an item(s) of AR information (e.g., items of AR information 11, 15, 17, 19, 21), the apparatus 50 may include means, such as the layer suggestion module 78, the processor 70 and/or the like, for providing the data corresponding to the selection of the item(s) of AR information to a device (e.g., display 85). In one embodiment the data corresponding to the selection of the item of AR information may be overlaid on corresponding real world objects currently being shown in the camera view of the display.

It should be pointed out that FIG. 9 is a flowchart of a system, method and computer program product according to an example embodiment of the invention. It will be understood that each block of the flowchart, and combinations of blocks in the flowchart, can be implemented by various means, such as hardware, firmware, and/or a computer program product including one or more computer program instructions. For example, one or more of the procedures described above may be embodied by computer program instructions. In this regard, in an example embodiment, the computer program instructions which embody the procedures described above are stored by a memory device (e.g., memory device 76, memory 96) and executed by a processor (e.g., processor 70, layer suggestion module 78, processor 94). As will be appreciated, any such computer program instructions may be loaded onto a computer or other programmable apparatus (e.g., hardware) to produce a machine, such that the instructions which execute on the computer or other programmable apparatus cause the functions specified in the flowchart blocks to be implemented. In one embodiment, the computer program instructions are stored in a computer-readable memory that can direct a computer or other programmable apparatus to function in a particular manner, such that the instructions stored in the computer-readable memory produce an article of manufacture including instructions which implement the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart blocks.

Accordingly, blocks of the flowchart support combinations of means for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In an example embodiment, an apparatus for performing the method of FIG. 9 above may comprise a processor (e.g., the processor 70, layer suggestion module 78, processor 94) configured to perform some or each of the operations (900-920) described above. The processor may, for example, be configured to perform the operations (900-920) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (900-920) may comprise, for example, the processor 70 (e.g., as means for performing any of the operations described above), the layer suggestion module 78, the processor 94 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:

facilitating provision of a plurality of executable layers of information, the layers of information provide one or more items of virtual information, comprising one or more images or videos, corresponding to information indicative of a current location of a communication device;

determining that at least one of the layers of information is enabled in response to detection of a selection, via a user interface of a display device of a communication device, of the layer of information, among the plurality of layers of information, to provide one or more items of virtual information currently being displayed via the display device, the items of virtual information correspond to locations of real world objects in or proximate to the current location being displayed via the display device;

determining, via a processor of the communication device, whether one or more other executable information layers of the layers are associated with content for the current location based on a determination that the number of items of virtual information, currently being displayed via the display device, for the enabled executable layer of information is below a predetermined threshold;

determining whether information associated with the enabled executable layer of information is in a same category as a category of information associated with the one or more other executable information layers; and automatically presenting visible indicia, to the user interface, suggesting one or more of the other executable information layers for selection via the user interface in response to determining that (i) the number of items of virtual information, currently being displayed via the display device is below the predetermined threshold and (ii) that the suggested executable information layers are in the same category as the enabled executable information layer; and activating a suggested executable information layer and presenting, to the user interface of the display device, visible content of corresponding items of augmented reality comprising geotagged information, comprising geo-coordinates of respective real world objects, the items of augmented reality are overlaid on respective structures depicting the real world objects in the topography of the location of the communication device currently being displayed, in response to detecting an indication of a selection, via the user interface, of the visible indicia of the suggested executable information layer.

2. The method of claim 1, wherein:
the one or more items of virtual information comprises one or more virtual objects.

3. The method of claim 1, wherein the geotagged information comprises one or more geotagged images or videos.

4. The method of claim 1, wherein receipt of the information indicative of the current location further comprises receiving information indicative of one or more coordinates of the real world objects that are currently being displayed.

5. The method of claim 1, further comprising:
determining that the information of each of the plurality of layers is provided by different content providers.

6. The method of claim 5, further comprising:
overlaying the virtual information on the corresponding real world objects in response to determining that location data of the virtual information corresponds to location information of at least one of the corresponding real world objects.

7. The method of claim 1, further comprising:
automatically presenting further comprises presenting the visible indicia, to the user interface, of the suggested other executable information layers in a semi-transparent manner prior to selection; and
providing visible data of the suggested executable information layer to the display device in a non-transparent manner to denote that the suggested executable information layer is active in response to the detection of the selection of the suggested executable information layer.

8. The method of claim 1, further comprising:
determining that the virtual information comprises one or more items of information in augmented reality that are usable to augment real world objects currently being displayed in an instance in which the items of information are overlaid on the real world objects, and wherein items of augmented reality further comprises enabling provision of the items of augmented reality for selection, via the user interface, to obtain additional information corresponding, in part, to geographical coordinates of at least one selected item of augmented reality.

9. An apparatus comprising:
at least one processor; and
at least one memory including computer program code, the at least one memory and the computer program code configured to, with the at least one processor, cause the apparatus to perform at least the following:
facilitate provision of a plurality of executable layers of information, the layers of information provide one or more items of virtual information, comprising one or more images or videos, corresponding to information indicative of a current location of the apparatus;
determine that at least one of the layers of information is enabled in response to detection of a selection, via a user interface of a display device of the apparatus, of the layer of information, among the plurality of layers of information, to provide one or more items of virtual information currently being displayed via the display device, the items of virtual information correspond to locations of real world objects in or proximate to the current location being displayed via the display device;
determine whether one or more other executable information layers of the layers are associated with content for the current location based on a determination that the number of items of virtual information, currently being displayed via the display device, for the enabled executable layer of information is below a predetermined threshold;

determine whether information associated with the enabled executable layer of information is in a same category as a category of information associated with the one or more other executable information layers;
automatically present visible indicia, to the user interface, suggesting one or more of the other executable information layers for selection via the user interface in response to determining that (i) the number of items of virtual information, currently being displayed via the display device is below the predetermined threshold and (ii) that the suggested executable information layers are in the same category as the enabled executable information layer; and
activate a suggested executable information layer and present, to the user interface of the display device, visible content of corresponding items of augmented reality comprising geotagged information, comprising geo-coordinates of respective real world objects, the items of augmented reality are overlaid on respective structures depicting the real world objects in the topography of the location of the apparatus currently being displayed, in response to detection of an indication of a selection, via the user interface, of the visible indicia of the suggested executable information layer.

10. The apparatus of claim 9, wherein:
the one or more items of virtual information comprises one or more virtual objects.

11. The apparatus of claim 9, wherein the geotagged information comprises one or more geotagged images or videos.

12. The apparatus of claim 9, wherein the memory and computer program code are configured to, with the processor, cause the apparatus to facilitate the receipt of the information indicative of the current location by receiving information indicative of one or more coordinates of the real world objects that are currently being displayed.

13. The apparatus of claim 9, wherein the memory and computer program code are configured to, with the processor, cause the apparatus to:
determine that the information of each of the plurality of layers is provided by different content providers.

14. The apparatus of claim 13, wherein the memory and computer program code are configured to, with the processor, cause the apparatus to:
overlay the virtual information on the corresponding real world objects in response to determining that location data of the virtual information corresponds to location information of at least one of the corresponding real world objects.

15. The apparatus of claim 9, wherein the memory and computer program code are configured to, with the processor, cause the apparatus to:
automatically present by presenting the visible indicia, to the user interface, of the suggested other executable information layers in a semi-transparent manner prior to selection; and
provide visible data of the suggested executable information layer to the display device in a non-transparent manner to denote that the suggested executable information layer is active in response the detection of the selection of the suggested executable information layer.

16. The apparatus of claim 9, wherein the memory and computer program code are configured to, with the processor, cause the apparatus to:
determine that the virtual information comprises one or more items of information in augmented reality that are usable to augment real world objects currently being displayed in an instance in which the items of information are overlaid on the real world objects; and present the items of augmented reality by enabling provision of the items of augmented reality for selection, via the user interface, to obtain additional information corresponding, in part, to geographical coordinates of at least one selected item of augmented reality.

17. A computer program product comprising at least one non-transitory computer-readable storage medium having computer-readable program code portions stored therein, the computer-readable program code portions comprising:

program code instructions configured to facilitate provision of a plurality of executable layers of information, the layers of information provide one or more items of virtual information, comprising one or more images or videos, corresponding to information indicative of a current location of an apparatus;

program code instructions configured to determine that at least one of the layers of information is enabled in response to detection of a selection, via a user interface of a display device of a communication device, of the layer of information, among the plurality of layers of information, to provide one or more items of virtual information currently being displayed via the display device, the items of virtual information correspond to locations of real world objects in or proximate to the current location being displayed via the display device;

program code instructions configured to determine whether one or more other executable information layers of the layers are associated with content for the current location based on a determination that the number of items of virtual information, currently being displayed via the display device, for the enabled executable layer of information is below a predetermined threshold;

program code instructions configured to determine whether information associated with the enabled executable layer of information is in a same category as a category of information associated with the one or more other executable information layers;

and program code instructions configured to automatically present visible indicia, to the user interface, suggesting one or more of the other executable information layers for selection via the user interface in response to determining that (i) the number of items of virtual information, currently being displayed via the display device is below the predetermined threshold and (ii) that the suggested executable information layers are in the same category as the enabled executable information layer; and program code instructions configured to activate a suggested executable information layer and present, to the user interface of the display device, visible content of corresponding items of augmented reality comprising geotagged information, comprising geo-coordinates of respective real world objects, the items of augmented reality are overlaid on respective structures depicting the real world objects in the topography of the location of the apparatus currently being displayed, in response to detection of an indication of a selection, via the user interface, of the visible indicia of the suggested executable information layer.

18. The computer program product of claim 17, wherein:
the one or more items of virtual information comprises one or more virtual objects.

19. The computer program product of claim 17, wherein the geotagged information comprises one or more geotagged images or videos.

20. The computer program product of claim 17, further comprising:

program code instructions configured to automatically present by presenting the visible indicia, to the user interface, of the suggested other executable information layers in a semi- transparent manner prior to selection; and program code instructions configured to provide visible data of the suggested executable information layer to the display device in a non-transparent manner to denote that the suggested executable information layer is active in response to the detection of the selection of the suggested executable information layer.

* * * * *